Sept. 6, 1927.
P. K. McGALL
MEASURING INSTRUMENT
Filed Oct. 22, 1919
1,641,447
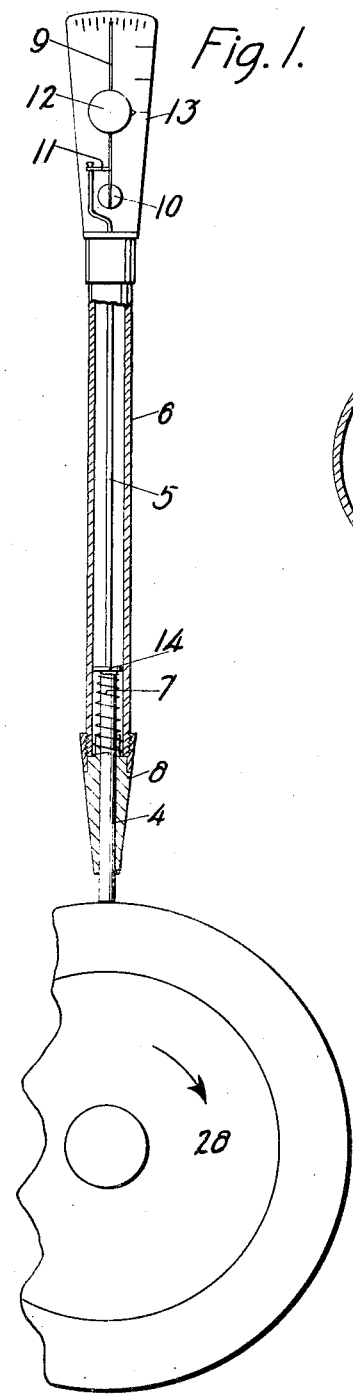
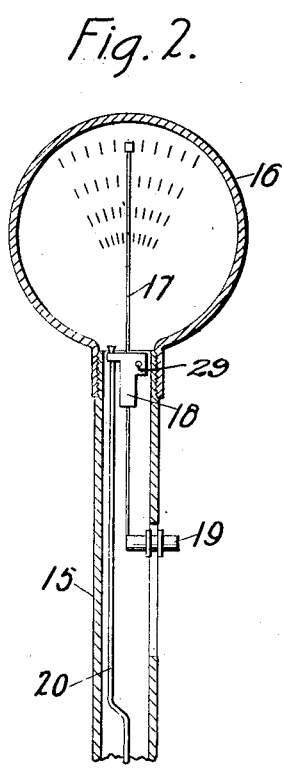
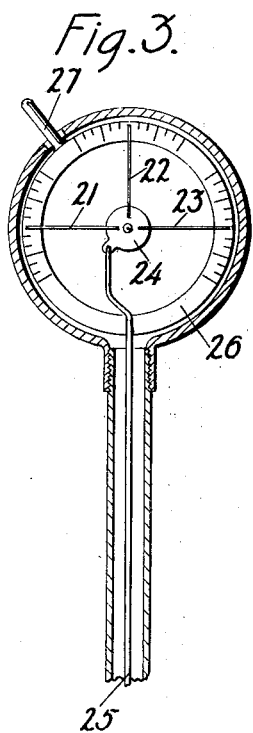
Inventor:
Philip K. McGall.
by Joel C. B. Palmer Att'y Patented Sept. 6, 1927.

1,641,447

UNITED STATES PATENT OFFICE.

PHILIP K. McGALL, OF WEST ORANGE, NEW JERSEY, ASSIGNOR TO WESTERN ELECTRIC COMPANY, INCORPORATED, OF NEW YORK, N. Y., A CORPORATION OF NEW YORK.

MEASURING INSTRUMENT.

Application filed October 22, 1919. Serial No. 332,418.

This invention relates to measuring instruments, and particularly to instruments for measuring the eccentricity of revolving parts.

The principal object of this invention is the provision of a method of measurement and an instrument effective for performing the method which will give a direct quantitative indication of the eccentricity of the revolving part being tested.

The invention makes use of a vibrating element which, when acted upon by a successively applied force, will be caused to vibrate in accordance with the character of such force. This vibrating element is provided with means whereby the natural frequency thereof may be adjusted to correspond to the particular frequency of the revolving part, the eccentricity of which is being measured.

A more definite understanding of the invention may be had from the following description taken in conjunction with the accompanying drawings which form a part thereof. In Fig. 1 there is shown in section an instrument embodying one feature of the invention, while Figs. 2 and 3 show modifications of that shown in Fig. 1.

In Fig. 1, there is shown an instrument of the character previously referred to in which a plunger 4 projects beyond the lower end of a tubular casing 6. The casing 6 has secured thereto a portion 8 which is adapted to be removed for the purpose of replacing the plunger 4 should it at any time become worn. In the preferred construction of the instrument, the casing 6 is made of hard rubber, but may be of any other suitable material. It may also be noted that the plunger 4, in this particular form, is of carbon or of any other material which will not wear the surface to which it is applied. The plunger 4 is held in position by means of a coiled spring 7, one end of which is secured to the plunger 4, the other end being held in position by means of a groove cut in the portion 8. To the upper part of the casing 6 is detachably secured a plate 13 upon which suitable scales are marked. One end of the vibrating element 9 is fixedly held on the plate 13 by means of a metal portion 10 so that the vibrating element 9 will not drag upon the plate 13 when caused to vibrate. A rod 5 having a washer or a metal portion 14 secured at its lower end, extends through the casing 6 and is connected to the vibrating element 9 by means of a connecting link 11. The link 11 is rigidly connected by riveting, welding, or by other suitable means to the vibrating reed 9, and is loosely connected to the rod 5 by means of any flexible joint. A weight 12 having a slot cut therein is adapted to be slipped over the vibrating element 9, it being held in adjusted position thereon by friction or any other suitable means. The washer 14 rests upon the plunger 4 so that any movement of the plunger will be transmitted to the vibrating element 9. The weight 12 is adapted to be moved in position adjacent the marks shown on the right-hand vertical edge of the plate 13 and which indicate different rates of speed at which the reed 9 vibrates with the maximum amplitude for any amount of eccentricity the shaft to be measured may have. The angular displacement of reed 9 over the upper scale of plate 13 which may be graduated in any suitable units is proportional to the amount of eccentricity of the revolving shaft when this shaft is moving at the speed indicated by the position of the weight 12 on one of the marks shown adjacent the right-hand vertical edge of plate 13.

Referring now to Fig. 2, there is shown a casing 15 to which is secured a circular plate 16 upon which several scales are marked. These scales are for the same purpose as the scale near the upper edge of plate 13 of Fig. 1. A vibrating element 17 passes through a hole in plate 18 hinged by means of a pin 29 to the casing 15 and designed to rock back and forth thereon and the element is held in place by means of the friction exerted upon it by the walls of the hole in the plate 18. The effective length of the vibrating element is adapted to be varied by means of a handle 19 attached thereto which projects out through the casing 15. A rod 20 is secured to the hinged plate 18 and any movement of this rod caused by the movement of a plunger similar to that shown in Fig. 1, will cause the vibrating element 17 to vibrate.

In the modification, as shown in Fig. 3, there is shown a number of vibrating elements such as 21, 22 and 23. These vibrating elements are made of different weight steel and are so selected that the natural period of each is different from the other two, that is, the vibrating element 21 may be adapted to be in resonance at a speed of 2400 revolutions per minute, while the vibrating elements 22 and 23 may be adapted to be in resonance at higher or lower speeds or vice versa. These vibrating elements are secured to a pivoted hub portion 24 to which is attached a rod 25. A dial 26 having several scales marked thereon is adapted to be turned a small angular distance by means of the handle 27 in order to move the zero mark of either scale into register with the medial position of its associated reed, which position may change by accident or wear in the parts of the operating mechanism. It is, of course, to be understood that there is also provided in connection with each instrument, as heretofore described, a plunger together with its necessary parts as was described in connection with Fig. 1.

The operation of a device of this character is as follows: Let it be assumed that the device shown in Fig. 1 is employed and that a member 28 is revolving at a known rate of speed and for the sake of clearness, let it be assumed to be 2400 revolutions per minute. Before making the test, the weight 12 must be adjusted so that it coincides with that mark at the right-hand edge of plate 13 which corresponds to 2400 revolutions per minute. Then, if it is desired to determine the eccentricity of the revolving member 28, all that is necessary is to apply the plunger 4 to a surface of the revolving member 28. If the member 28 is correctly centered, there will be no movement of the plunger and consequently no movement of the rod 5 for causing the vibration of the element 9. This, however, is not the case if the member 28 is not accurately centered and any irregularities of the surface will cause the plunger to be moved rapidly up and down which, in turn, moves the rod 5 and causes the vibrating element 9 to describe an arc depending upon the amount which the member 28 is off center. The scales marked off on plate 13 may conveniently be calibrated by means of a standard rotating device whose frequency and eccentricity are known, or if desired they may be calibrated by means of a vibrating lever capable of being vibrated with a variable amplitude of vibration. The vertically disposed scale is adapted to indicate the positions at which the reed 9 vibrates with a maximum amplitude for given rates of revolutions per minute of shaft 28 and by means of the scale marked off on the top of plate 13 the amount which the member 28 is off center may easily be read.

The operation of the instrument as shown in Fig. 2 is identical with that of Fig. 1 with the exception that in place of varying the effective length of the vibrating element by means of a weight 12 to alter this frequency for various speeds, the length of the vibrating element is actually varied. This is accomplished by means of the handle 19.

As to the operation of the instrument shown in Fig. 3, it is not necessary to vary the effective length of the vibrating elements as in this case each element has been adjusted to vibrate with the maximum amplitude at a particular speed. In such case, the instrument need only be applied to the revolving part, the eccentricity of which it is desired to measure and if the part is not correctly centered, one of the three elements such as 21, 22 and 23 will be caused to vibrate, depending upon the particular speed at which the part is revolving.

An instrument of this construction is particularly applicable to the testing of commutators, of motors and generators, where it has been found that the vibrating element was unaffected by the irregularities or bumps formed by the wear or disarrangement of the bars with respect to the machine shaft. It is, of course, obvious that such an instrument is adapted to be used in measuring the eccentricity of other revolving parts and it is not intended to limit the invention to this particular use.

What is claimed is:

1. A measuring instrument comprising a casing, a graduated plate mounted on said casing, a plunger, a rod, resilient means for holding said plunger in abutment with said rod, a vibratory element connected with said rod whereby any vibrations of a revolving member upon which said plunger is placed will cause said element to vibrate for indicating said variations, and means for changing the natural frequency of said element to accord with the speed of said member.

2. A measuring instrument comprising a casing, a plate mounted on said casing and having a scale thereon, a vibratory element secured on said plate, and a plunger adapted when placed on the surface of a moving member to impart a motion to said element whereby any variations in the surface of said member will be indicated by the angular displacement of said element adjacent said scale.

3. In a measuring instrument, a casing, a plate mounted on said casing and having a scale thereon near one end, a reed fixedly mounted at the other end of said plate, means for causing said reed to vibrate adjacent said scale, and means whereby the natural period of vibration of said reed may be varied.

4. A measuring instrument comprising a casing, a graduated plate mounted on said casing, a reed supported at one end on said plate, a plunger adapted when placed on a revolving member to impart a motion to said reed to cause said reed to vibrate whereby any variation of said surface will be indicated by the vibration of said reed adjacent said scale, and means whereby the period of vibration of said reed may be varied.

5. A measuring instrument comprising a casing, a plate mounted on said casing, and having a scale thereon near one end, a vibratory element fixed at the other end of said plate, means for causing said element to vibrate, and a member adjustably mounted on said element by means of which the natural period of vibration of said element may be varied.

6. A measuring instrument consisting of a casing, a graduated plate mounted on said casing, a reed fixedly mounted at one end on said plate, a plunger, means for holding said plunger in position in said casing, a rod attached to said reed and adapted to rest on said plunger and when moved to impart a vibrating motion to said reed whereby any variation of a revolving surface upon which said plunger is placed will be communicated to said reed to indicate such variation, and a weight adjustably mounted on said reed by means of which the reed may be caused to vibrate with a maximum amplitude in synchronism with the frequency of the moving body.

7. In combination, a plate, a vibratable element mounted on said plate, means whereby said element may be attuned to different rates of vibration, a series of substantially aligned and contacting elements, one end element of the series being arranged for application to a rotating body, and mechanical connections between the other end element of the series and said vibratable element, whereby the latter will be caused to vibrate if the portion of the rotating body with which contact is made is eccentric, there being a scale marked on said plate adjacent said vibratable element in accordance with which the degree of vibration may be observed and the corresponding eccentricity determined.

In witness whereof, I hereunto subscribe my name this 14th day of October A. D., 1919.

PHILIP K. McGALL.